United States Patent [19]

Glanton

[11] 4,449,876

[45] May 22, 1984

[54] CARGO BRACE

[75] Inventor: Thomas J. Glanton, Oxford, Ga.

[73] Assignee: Guelda Gene Glanton, Conyers, Ga.

[21] Appl. No.: 302,187

[22] Filed: Sep. 14, 1981

[51] Int. Cl.³ .......................... B60P 7/14; B61D 45/00
[52] U.S. Cl. .................................. 410/151; 52/126.4;
    52/126.7; 52/632; 211/105.4; 248/354.3;
    410/149
[58] Field of Search .................. 52/126.3, 126.4, 126.7,
    52/238, 243, 632; 211/105.4, 123; 248/57, 354
    S, 356, 357; 410/143, 144, 145, 149, 151

[56] References Cited

U.S. PATENT DOCUMENTS

| 969,002 | 8/1910 | Teachout | 410/151 |
|---|---|---|---|
| 2,219,169 | 10/1940 | Alter | 248/354 S |
| 2,570,282 | 10/1951 | Speck et al. | 248/354 S |
| 2,608,420 | 8/1952 | Eck | 410/149 |
| 2,963,131 | 12/1960 | Brockway | 52/126.4 |
| 3,880,394 | 4/1975 | Wisecarver | 410/151 X |

FOREIGN PATENT DOCUMENTS 1033880  7/1958  Fed. Rep. of Germany ........ 52/122

Primary Examiner—Randolph Reese
Assistant Examiner—David F. Hubbuch
Attorney, Agent, or Firm—Kenneth E. Darnell

[57] ABSTRACT

An extendible brace or dunnage bar for stabilizing cargo items within the interior of a cargo transport vehicle, the invention provides a simple, reliable and inexpensive device capable of rapid positioning relative to an object which is to be braced against movement. In a first embodiment, an elongate bar is received within a rectangular casing and is provided with spur-like elements on the free end of the bar for engaging an interior wall of a freight car. The rectangular casing is provided with a threaded collar which receives a threaded rod displaceable longitudinally of the elongate bar to cause extension or contraction of the brace on rotation of the rod. The rod terminates at its free end with a freely mounted foot plate adapted to engage a freight car wall opposite the first-mentioned wall or a surface of a cargo item itself, the rod being rotated to mount the brace therebetween through use of a tool such as a wrench in engagement with a nut permanently joined to the rod adjacent to the foot plate. In a further embodiment, a hollow tubular member is permanently mounted to the threaded rod adjacent the nut and slidably receives an elongate rod-like handle, the handle being slipped through the tubular member to a position allowing manual grasping and rotation of the handle to tighten or to release the brace from a load-engaging position.

36 Claims, 9 Drawing Figures

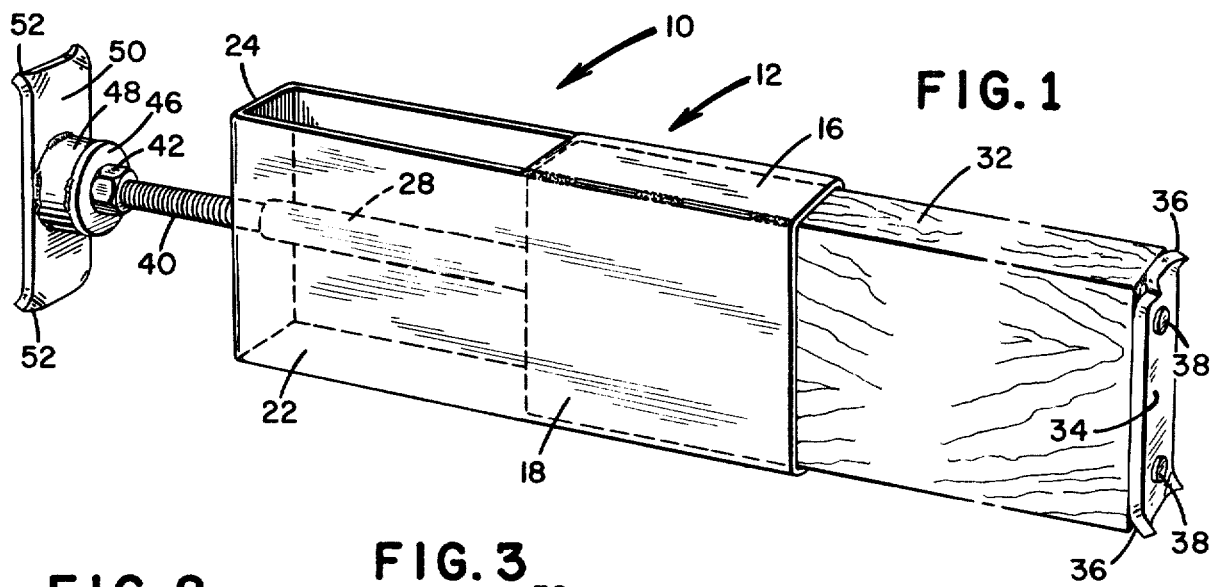
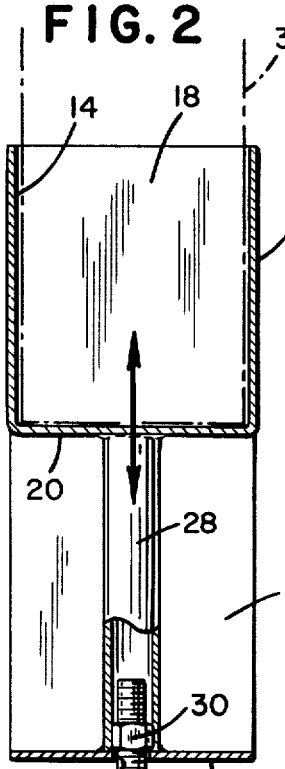
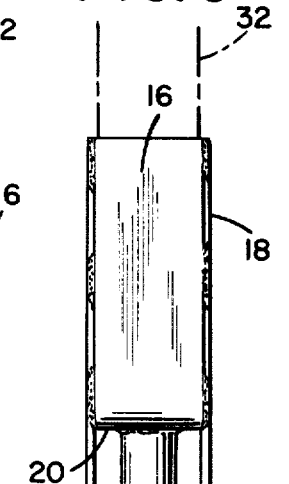
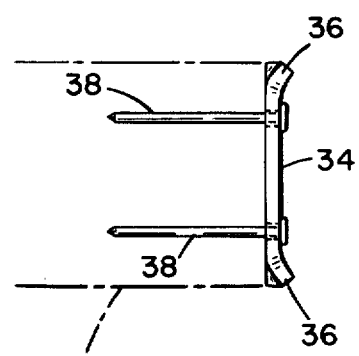
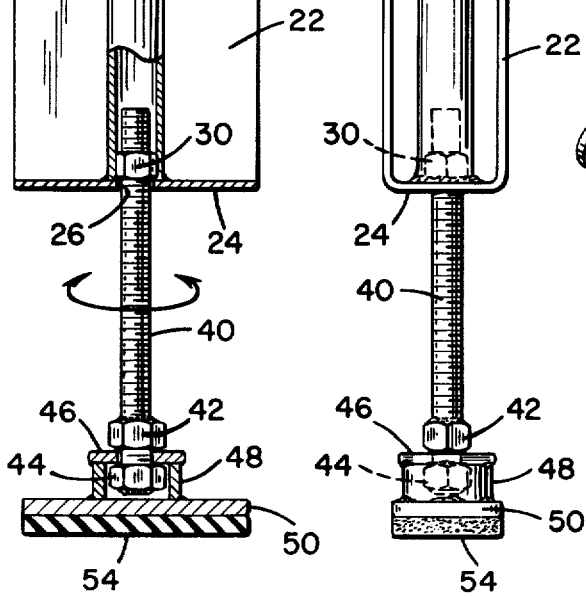

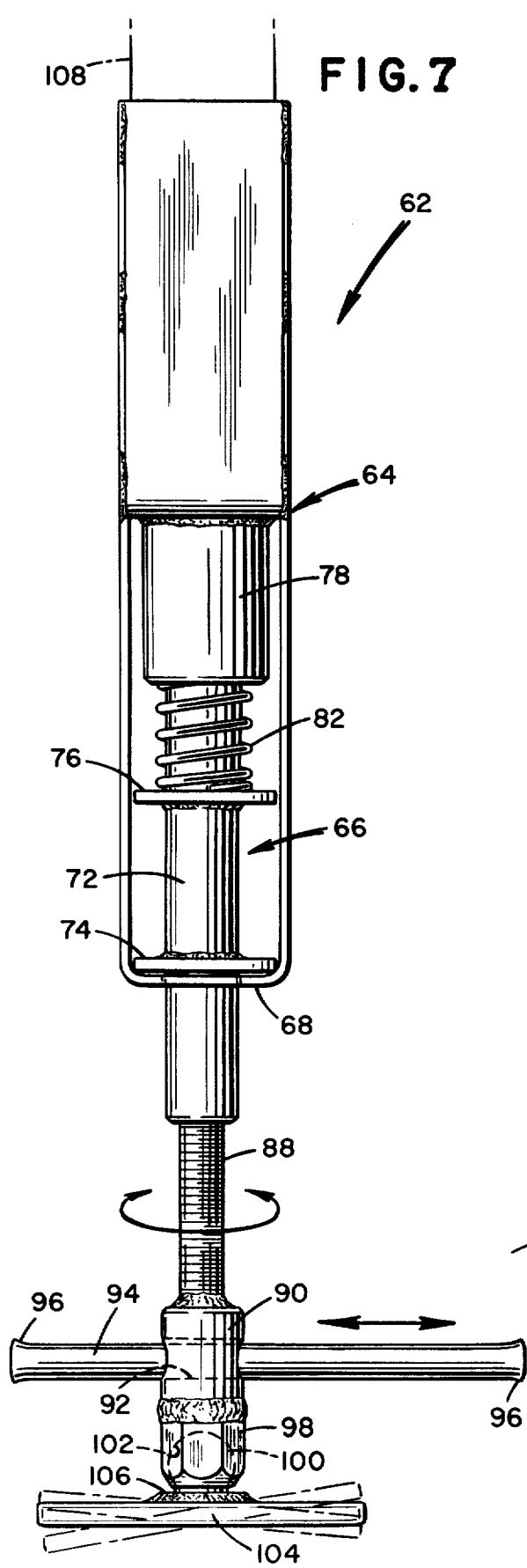
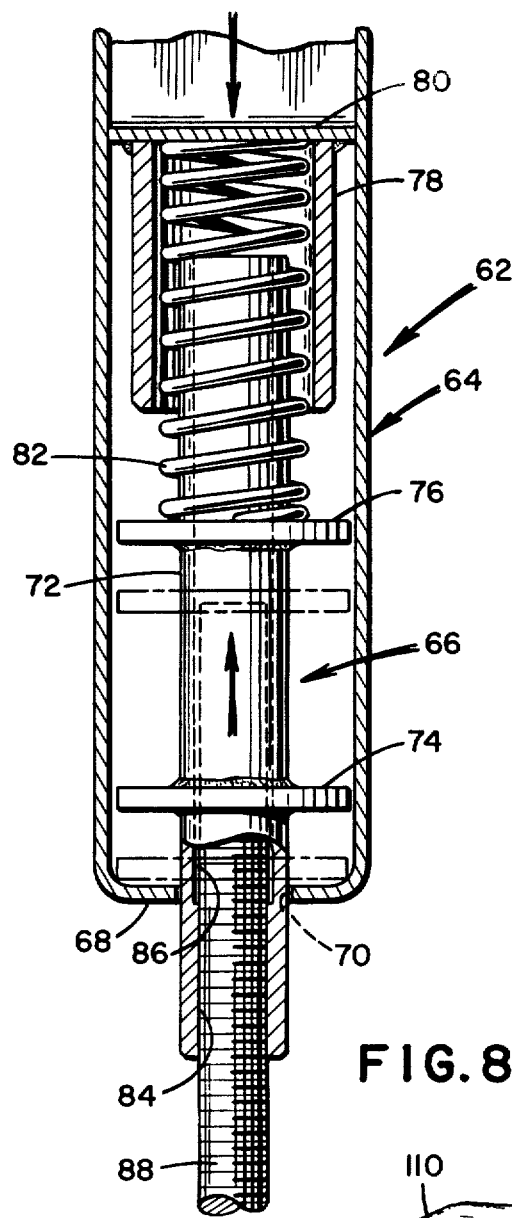
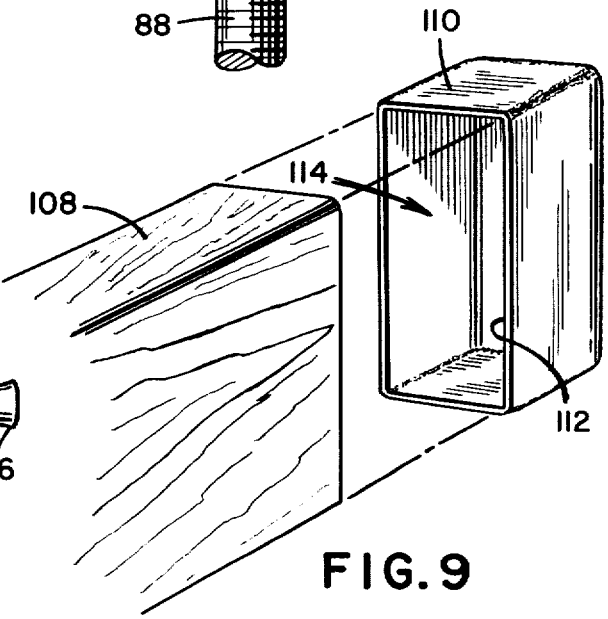
FIG. 7
FIG. 8
FIG. 9

CARGO BRACE

BACKGROUND OF THE INVENTION

1. Field of the Invention

The invention relates generally to bracing devices and particularly to load stabilization devices capable of preventing the incidental and often injurious shifting of cargo within a freight-carrying car such as a truck trailer or train car.

2. Description of the Prior Art

Devices known as dunnage bars have long been used to brace or support cargo items within cargo carrying areas of land, air and sea vehicles. Such devices are particularly required where partial loads are contained within train boxcars, truck trailers and the like, the free space within such vehicles allowing the potentially damaging shifting of cargo on movement of the vehicle. Containerized freight disposed within a truck trailer, for example, is subject to forward/rearward shifting during normal operation of the vehicle. A dunnage device can thus be used to brace a cargo item against shifting movement along the longitudinal axis of the vehicle, that is, along the direction of motion thereof. Further, a dunnage bar or similar device can be used to brace multiple cargo elements within a portion of a storage hold by disposing one or more dunnage bars transversely of the storage hold to effectively form a temporary restraining wall within the cargo hold to prevent shifting of cargo contained therein.

Dunnage devices are described by Teachout in U.S. Pat. No. 969,002 and by Sharp in U.S. Pat. No. 3,214,027, these devices being used in environments similar to that for which the present invention is intended. Astrom, in U.S. Pat. No. 891,897, describes a trench brace which is utilized to shore timbers and the like in excavations, the bracing function thus described being similar to the bracing function of a dunnage device and thus falling within the intended use environment of the structure of the present invention. Similar load stabilization and bracing devices are described in the patent literature and are available for use. However, prior art structures have typically been either expensive and difficult to use as well as generally inappropriate for all but a few bracing situations. The more recent cargo bracing or bulkhead systems are structurally complex and difficult to assemble by a single worker, such prior devices and systems also often fail to provide the necessary compressive forces needed to prevent the shifting and tipping of cargo contained within a freight storage compartment of a moving vehicle. The present invention provides an effective dunnage brace capable of resisting shifting, sliding and tipping movement of cargo items, the present structure being relatively inexpensive, light in weight and structurally simple while exhibiting maximum strength and providing maximum stability to a load which would otherwise be loosely contained within a cargo hold and therefore subject to potentially damaging movement on movement of the vehicle. Accordingly, the invention intends improvement over the structures of the prior art and exhibits advantages thereover as will be more fully referred to hereinafter.

SUMMARY OF THE INVENTION

The invention provides an extendible brace capable of being positioned within the interior of a cargo transport vehicle to prevent shifting or other movement of cargo which can be damaging to the cargo or to the vehicle itself. The structure of the invention is particularly capable of being readily and rapidly positioned by a single worker with a minimum of effort, further advantages of the structure being high strength and low cost which allows wide usage of the structure in a variety of use environments including cargo bracing. In a first embodiment of the invention, a rectangular casing common to the several embodiments of the invention includes a rectangular recess adapted to receive one end of an elongate bar thereinto, the free end of the bar extending into contact with a surface against which force is to be directed. The elongate bar can conventionally and conveniently comprise a wooden board such as a "2×4" although the elongate bar can be otherwise dimensioned to suit the needs of a particular use environment. The free end of the elongate bar is preferably provided with a plate having spurs or spike-like gripping studs extending outwardly thereof, the plate being engageable with a preferably wooden surface provided adjacent to or contiguous to a wall of a freight-carrying vehicle such as a truck trailer and the like. The rectangular casing is provided at its other end with a threaded mounting nut which is permanently attached to the casing, the nut receiving a threaded rod thereinto, the rod being rotatable within the nut to cause extension or contraction of the brace itself. The threaded rod is preferably received within a tubular support which extends longitudinally of the casing and houses the threaded nut at the distal end thereof, the threaded rod extending into the tubular member on contraction of the brace. The tubular member is primarily intended to structurally strengthen the casing. On the free end of the threaded rod is disposed a pair of spaced, permanently mounted nuts having a washer-like plate disposed therebetween, the washer-like plate being freely movable between the nuts. The washer-like plate is permanently mounted to free peripheral edges of an annular collar which is in turn mounted to a flat foot plate which biases against an opposing surface on "tightening" of the brace caused by outward movement of the threaded rod on appropriate rotation of said rod within the threaded nut as aforesaid. The foot plate located at the distal end of the threaded rod can also be provided with cleats or spur-like members for engaging wooden or similar surfaces to thereby facilitate connection of the brace to a wall of the vehicle or to cargo itself. Alternately, the foot plate can be provided with an outer pad of resilient material for protection of a wall or other surface which is to be protected from damage due to cleat penetration and the like. The threaded rod is rotated to cause extension or contraction of the brace by manipulation of the externally disposed permanently-mounted nut located near the distal end of the threaded rod, the nut being engaged by a wrench or similar tool to facilitate rotation of the threaded rod in a direction which either extends the brace or to allow tensioned mounting of the brace between two surfaces or which contracts the brace to allow proper sizing thereof or release of the brace from a tensioned position.

In a further embodiment of the invention, a hollow tubular member is permanently mounted to the threaded rod adjacent the distal end thereof, the tubular member providing a slip housing for an elongated handle element which can be slipped through the tubular member to positions allowing manual grasping and rotation of the threaded rod to either tighten or release the brace from a load-engaging position. The invention further contemplates provision of swivel structure associated with the foot plate to facilitate positioning of the present brace diagonally within a cargo hold of a freight-carrying vehicle or to brace surfaces disposed at angles to each other.

Accordingly, it is an object of the present invention to provide an extendible brace or dunnage bar for stabilizing cargo items within the interior of a cargo transport vehicle, the present structure being of simple design while exhibiting maximum strength and reliability.

It is another object of the invention to provide an extendible bracing structure of inexpensive manufacture which is reliable in use and capable of rapid positioning relative to objects or surfaces which are to be braced against movement.

It is yet another object of the present invention to provide an extendible brace or dunnage bar capable of rapid installation without the requirement for extraneous tools, the device including handle elements which allow tensioning of the brace between surfaces through the use of integral handle elements comprising the structure.

It is a further object of the invention to provide an extendible brace or dunnage bar configured to accommodate a variety of shapes or sizes of cargo items and which can be readily and rapidly positioned by a single worker to positively support the cargo items against potentially injurious movement within the storage volume of a freight-carrying conveyance.

Further objects and advantages of the invention will become more readily apparent in light of the following description of the preferred embodiments of the invention.

BRIEF DESCRIPTION OF THE DRAWINGS

FIG. 1 is a perspective view of a first embodiment of the invention, the structure being shown as including an elongate bar having a cleated plate at one end thereof;

FIG. 2 is a side elevational view of another embodiment of the invention operable similarly to the embodiment of FIG. 1 but employing a foot plate having a padding element formed thereon;

FIG. 3 is an elevational view in partial section taken at right angles to the view of FIG. 2;

FIG. 4 is a plan view of the foot plate of FIG. 1;

FIG. 5 is an elevational view of a cleated plate used to facilitate connection of the device to a penetrable wall;

FIG. 6 is a perspective view of the present dunnage bar configured to include an integral slip-handle structure for facilitating operation of the bar without the need for extraneous tools and the like;

FIG. 7 is a side elevational view of a further embodiment of the invention;

FIG. 8 is a detail elevational view of a portion of the structure of FIG. 7; and, FIG. 9 is a detail perspective view of an end cap used to cover the end of an elongate bar which forms a portion of the several embodiments of the invention.

DESCRIPTION OF THE PREFERRED EMBODIMENTS

Referring now to the drawings and particularly to FIGS. 1-3, a cargo brace 10 configured according to the invention is seen to comprise a rectangular casing 12 which can remain identical in structure as used within certain embodiments of the invention. The casing 12 is seen to define at one end a box-like housing recess 14 bounded by minor sidewalls 16 and by major sidewalls 18, the sidewalls 16 an 18 being joined along inner peripheral edges to a retaining wall 20 to define the recess 14. One end of the casing 12 is therefore seen to comprise an open-ended box-like receptacle which receives one end of an elongate bar 32 as will be further described hereinafter. The major sidewalls 18 may be integrally formed with extended major sidewalls 22 which are joined together at the second end of the casing 12 through a bight plate 24. The extended major sidewalls 22 and the bight plate 24 thus provide a U-shaped open-sided end portion which structurally constitutes the second, opposite end of the casing 12 from the open-ended receptacle portion thereof.

The bight plate 24 is seen to be formed with an aperture 26 located centrally therein, the longitudinal axis of the aperture 26 extending longitudinally of the rectangular casing 12. A tubular member 28 extends longitudinally between the retaining wall 20 and the bight plate 24 and has its longitudinal axis perpendicular to the planes of said wall 20 and said plate 24. The tubular member 28 is joined to both the retaining wall 20 and to the bight plate 24 such as by welding, the tubular member 28 being disposed in aligned relation with the aperture 26 such that access to the interior of the tubing member 28 can be gained through the aperture 26 in the bight plate 24. As can particularly be seen in FIG. 2, a threaded nut 30 is disposed within the tubular member 28 immediately adjacent the aperture 26 in the bight plate 24. The threaded nut 30 can alternately comprise a thickened and threaded interior portion of the tubular member 28 itself, the structural requirement being only that some portion of the bight plate 24 about the aperture 26 or some portion of the interior of the tubular member 28 be threaded in order to receive the threads of a threaded rod 40 thereinto in order to allow an extension or contraction of the effective length of the cargo brace 10 on rotation of the threaded rod 40 relative to the threaded nut 30. Rotation of the threaded rod 40 within the threaded nut 30 in one direction causes the threaded rod 40 to be displaced outwardly of the rectangular casing 12 and, conversely, the threaded rod 40 is displaced inwardly on rotation thereof in the opposite sense. It is to be understood that the tubular member 28 is primarily intended to provide structural rigidity to the casing 12 rather than to provide a housing for the threaded rod 40 to move within, even though the tubular member 28 also provides such a function. In an alternate embodiment, the threaded nut 30 or a similar threaded collar member can be attached directly to the bight plate 24 about the aperture 26 to receive the threaded rod 40. However, increased structural strength is lended to the casing 12 by the provision of the tubular member 28, many use environments of the cargo brace 10 requiring this additional structural rigidity.

As is best seen in FIG. 1, one end of the elongate bar 32 is received within the recess 14 of the casing 12 and extends longitudinally of the casing 12 to a terminal end which is typically provided with a plate 34 having cleats 36 formed by knurling of the corners of the plate 34. The plate 34 can be affixed to the terminal end of the elongate bar 32 by means of nail fasteners 38 which can be driven through apertures located in the plate 34. The cleats 36 can be replaced by spikes or other elements which allow for penetration into a wall formed of a material such as wood, thereby to gain purchase against such a wall to facilitate a positive engagement between the brace 10 and the wall. The interior walls of a truck trailer, train boxcar or the like are typically provided with false walls formed of plywood or the like so that fasteners can be embedded into or otherwise affixed to the false walls without damage to the actual walls of the vehicle. The elongate bar 32 according to the present invention preferably comprises a wooden beam such as is typically referred to as a "2×4" although beams of varying sizes can be employed depending upon the requirements of the particular use. It is to be noted that the recess 14 in the casing 12 is sized to receive a particularly sized elongate bar. Use of a wooden beam to form the elongate bar 32 is particularly convenient due to the relatively low cost thereof and the ability to affix the cleated plate 34 to the terminal end thereof through the use of fasteners such as the nail fasteners 38 as shown particularly in FIG. 1 and in FIG. 5. The use of a wooden beam as the elongate bar 32 is also convenient in that the wooden beam can be cut to a desired length for use as part of the cargo brace 10. It is to be noted that the anterior end of the elongate bar 32 fits within the recess 14 of the casing 12 and abuts against that surface of the retaining wall 20 which is disposed within the recess 14. The elongate bar 32 thus transmits force along its length between a connection of the plate 34 to a vehicle wall or surface which is to be braced and the retaining wall 20.

The threaded rod 40 is provided in the embodiments of FIGS. 1-6 with a pair of spaced nuts 42 and 44 which are permanently mounted to the distal end of said rod 40. An annular washer 46 freely carried on the end of the rod 40 between the nuts 42 and 44 is permanently joined to outer peripheral edges of a cylindrical housing 48 mounted directly to a foot plate 50. Thus, the foot plate 50 is mounted to and carried by the free end of the rod 40 but is capable of clockwise or counterclockwise movement within the plane in which the plate 50 lies due to the rotational freedom allowed by the relative positions of the nuts 42, 44 mounted to the rod 40 with the nut 44 being enclosed within the chamber formed by the housing 48 and the washer 46. As seen in FIGS. 1 and 4, the foot plate 50 can be formed with cleats 52 which are similar in structure and function to the cleats 36 of the plate 34. Alternately, the foot plate 50 can comprise an essentially flat plate which is provided with an elastomeric pad 54 disposed over the outer surface thereof, the pad 54 bearing against a surface which is to be engaged by the foot plate 50 but which must not be damaged such as by penetration thereinto by projections such as the cleats 52. Although not shown, the plate 34 can be similarly structured in order to provide a contact surface which will not deface or damage the surface of a wall or object against which a force is to be exerted through the brace 10.

Regardless of the nature of the surfaces of the plates 34 and 50 which engage cargo objects or walls of truck trailers and the like, the cargo brace 10 functions essentially in the same general manner. In particular, the nut 42 which is disposed externally of the housing 48 adjacent the free end of the threaded rod 40 is engaged by a tool such as a wrench and rotated to cause the rod 40 itself to be rotated and, depending on the sense of the rotational displacement, to be displaced either inwardly or outwardly of the casing 12. The rod 40 is thus rotated within the nut 30 or corresponding structure associated with the bight plate 24 to provide the desired displacement of the rod 40, thereby to "tighten" the brace 10 between two opposing surfaces or to "loosen" brace 10 to allow removal of said brace from engagement between two surfaces.

As can be seen in FIG. 6, a further embodiment of the invention is seen to comprise essentially the basic structure described above and to further include a manually grippable handle assembly preferably formed integrally with the brace 10. The integral handle assembly eliminates the necessity for providing a tool such as a wrench to install and remove the brace 10 in a use environment since the structure necessary for accomplishing these functions are permanently made a part of the total structure. Further embodiments of the invention to be described hereinafter also exhibit structure capable of this advantage. As seen in FIG. 6, a tubular slip housing 56 is joined directly to the rod 40 such as by welding adjacent to the nut 42. While the nut 42 does not act in this embodiment in concert with a wrench as aforesaid, the nut 42 or a similar structural element is employed to "sandwich" along with the nut 44 the washer 46 for mounting the foot plate 50 to the distal end of the rod 40. Further, the nut 42 may also have a weld formed between it and the relatively thick-walled pipe which constitutes the slip housing 56. The slip housing 56 receives a rod-like handle 58 slidably therethrough, the handle 58 being of an outer diameter which is less than the inner diameter of the hollow slip housing 56. The handle 58 is of a length which allows a sufficiently large portion of the handle 58 to extend outwardly of the housing 56 so that the handle 58 can be grasped at a desired end and a mechanical advantage enjoyed to rotate the rod 40 on angular displacement of the handle 58. Each end of the handle 58 is provided with a flared end cap 60 which is disc-like in conformation and is of a diameter which is greater than the inner diameter of the slip housing 56, thereby preventing the handle 58 from sliding through the housing 56 and being removed from operative association therewith. By sliding the handle 58 within the slip housing 56 from one end of the housing 56 to the other end thereof, the handle 58 can be employed even in corners or near a floor or the like to fully tighten or loosen the cargo brace 10 as desired without resort to an extraneous tool such as a wrench which can be lost or be inadvertently moved from the workplace and thus not be available when needed.

Referring now to FIGS. 7-9, another embodiment of the invention is illustrated. As is seen particularly in FIGS. 7 and 8, a cargo brace generally designated as 62 is seen to have a casing 64 which is similar to the casing 12 of FIGS. 1-3. The casing 64 differs from the casing 12 in the provision of a shock-absorbing mechanism shown generally at 66 which is disposed essentially in the place of the tubular member 28 of the casing 12. As is seen in the drawing, bight plate 68 (corresponding in structure to the bight plate 24) is provided with aperture 70 through which a displaceable tubular member 72 extends. On the anterior side of the bight plate 68 and permanently mounted to the tubular member 72 are detente plate 74 and pressure plate 76, the plates 74 and 76 being spaced apart from each other along the length of the tubular member 72. The longitudinal axis of the tubular member 72 is seen to extend along the nominal longitudinal axis of the casing 64 itself. A cylindrical housing 78 is seen to be attached at an inner end to retaining wall 80 of the casing 64, the cylindrical housing 78 being open at its outer end to receive a coil spring 82 thereinto, the inner end of the coil spring biasing against the surface of the retaining wall 80 interiorly of the cylindrical housing 78. The coil spring 82 is further carried on the innermost end of the tubular member 72 and extends into contact with the pressure plate 76, the spring 82 thus being biased into a tensioned or compressed condition between the pressure plate 76 and retaining wall 80 on inward displacement of the tubular member 72 as is seen in phantom in FIG. 8. The detente plate 74 is seen to act as a stop to limit movement of the tubular member 72 in an outwardly oriented direction. The innermost end of the tubular member 72 is seen to be disposed only a partial distance interiorly of the cylindrical housing 78 in order that the tubular member 72 is allowed adequate travel on inward displacement of said member 72 to accommodate shock normally encountered within the use environment of the invention.

The tubular member 72 is seen best in FIG. 8 to have an internal threaded portion 84 disposed at the distal end thereof, the threaded portion 84 defining a forward end of a bore 86 which extends longitudinally through the tubular member 72. That portion of the bore 86 disposed inwardly of the threaded portion 84 is formed of a slightly greater diameter than the diameter of the threaded portion 84 in order to receive a threaded rod such as the threaded rod 40 thereinto. It is to be noted that a threaded rod such as the threaded rod 40 configured as shown in FIGS. 1-3 either with or without a slip housing and handle arrangement such as shown in FIG. 6 can be utilized with the casing 64 and shock-absorbing mechanism 66 as described above. In such a structure, the inner end of the threaded rod 40 would simply be received within the threaded portion 84 of the bore 86 of tubular member 72, the resulting assembly then being used in essentially the same manner as is the cargo brace 10, the brace being tightened or loosened by means of a wrench or by means of a slip housing and handle arrangement as is shown in FIG. 6. The casing 64 and shock absorbing mechanism 66 exhibit advantages within the use environment in that shocks of at least a certain magnitude are absorbed by the mechanism 66 with a resulting lower potential for damage to cargo or to the cargo-carrying vehicle itself. As importantly, the structure of the shock-absorbing mechanism 66 also causes the stabilizing tension afforded by the brace 62 to be maintained both before, during and after the incidence of a shock, thereby maintaining the brace 62 in a desired position relative to the cargo being braced in the vehicle within which the cargo is carried.

As is best seen in FIG. 7, modification can also be made to the distal end of a threaded rod 88 which corresponds in other particulars to the structure of the threaded rod 40. In the embodiment shown in FIG. 7, the distal end of the threaded rod 88 is provided with a cylindrical enlargement 90 having a transverse bore 92 formed therethrough, the bore 92 receiving an elongated rod 94 having flared portions 96 at each end thereof. The flared portions 96 are of a diameter greater than the diameter of the bore 92 in order to prevent removal of the rod 94 from the bore 92 even though the rod 94 can be moved within the bore 92. In essence, the structure thus described is similar in function to the tubular slip housing 56 and rod-like handle 58 of FIG. 6 since the rod 94 may be displaced within the bore 92 of the cylindrical enlargement 90 to function as a handle to facilitate rotation of the threaded rod 88, thus tensioning or loosening the cargo brace 62 to either install or remove the brace 62 as has been described more fully relative to the operation of the cargo brace 10.

The cylindrical enlargement 90 at the end of the threaded rod 88 terminates distally in a socket member 98 which can be formed with exterior faces in the manner of a nut such that the socket member 98 can be utilized to tension or loosen the cargo brace 62 in a manner similar to the use of the nut 42 of FIGS. 1-3. It is to be understood that the threaded rod 88 itself can be configured to terminate in a structure similar to the socket member 98 without provision of the cylindrical enlargement 90 in the event that an integral handle arrangement such as is provided by the rod 94 is not desired for use in a particular brace. The socket member 98 primarily functions as a portion of a ball and socket mechanism of which ball 100 acts as the other portion. Major portions of the ball 100 are received within interior chamber 102 of the socket member 98, the ball 100 being movable within and relative to the socket member 98 to allow a certain freedom of movement of foot plate 104, the ball 100 being either permanently mounted directly to the foot plate 104 or mounted to a washer 106 which is in turn mounted directly to the foot plate 104 such as by welding. As is known in the corresponding art, the ball 100 is retained within the interior chamber 102 of the socket member 98 and provides a degree of freedom to the foot plate 104 as is shown in phantom in FIG. 7, thereby allowing the cargo brace 62 to be utilized in a diagonal sense within a storge container within which cargo is to be braced. The foot plate 104 can simply be provided with the flat outer surface shown or can be configured as is shown in the embodiments of FIGS. 1-3 with cleats or elastomeric pads as is desired according to a particular usage.

As is seen in FIG. 9, a further modification of the invention includes the disposition on the free end of an elongate bar 108 of a box-like cap 110 which takes the form of a rectangular solid which defines a recess 112 which is congruent in shape with the shape of the cap 110. The cap 110 is open at 114 to allow access to the recess 112, the free end of the bar 108 being received thereinto. It is to be noted that the elongate bar 108 is essentially identical in structure and function to the bar 32 of FIG. 1. The box-like cap 110 is preferably formed of metal and therefore provides additional structural strength to the bar 108 at the end thereof.

The invention is therefore seen to include a number of explicitly described embodiments which can employ common structure and which can encompass differing structural elements for providing similar functions. Although not explicitly shown in the drawings, it is to be understood that an elongate bar such as the bar 32 or the bar 108 can be provided at both ends thereof with braces comprised of the casings 12 or 64 and the structures associated therewith. It is also to be understood that the invention can be practiced other than as expressly described herein without departing from the scope of the invention as defined by the appended claims.

What is claimed is:

1. A brace, comprising:
   a rod;
   an elongate bar;
   a substantially elongate casing having a first end portion and a second end portion, the first end portion comprising spaced walls defining a box-like receptacle open at said first end portion of said casing, one end of the bar being received within the box-like receptacle and extending outwardly of the casing in a direction essentially parallel to the longitudinal axis of the rod to engage a surface of an object against the free end of the bar, thereby extending the effective length of the brace;

means disposed interiorly of the casing for precluding communication between the bar and the rod;

means carried by the casing at the second end portion thereof and receiving a portion of the rod for maintaining the rod in position relative to the casing when the rod is at rest and for allowing displacement of the rod relative to the casing on movement of the rod to cause the length of the combined rod and the casing to vary, at least the free end of the rod extending beyond and externally of the second end portion of the casing, the rod being threaded along at least a portion of its length engaging the maintaining means and at least a portion of the maintaining means being threaded to matingly receive the threaded portion of the rod thereinto to cause displacement of the rod relative to the casing on relative rotation of the rod and of the maintaining means;

a foot plate carried by the free end of the rod;

a housing mounted to an inner surface of the foot plate and having an aperture formed centrally therein to freely receive the distal end of the rod therethrough;

means formed on the distal end of the rod and disposed within the housing for retaining the distal end of the rod within said housing, the foot plate being freely mounted for rotation on the rod; and, means formed on the rod proximate to the housing for facilitating rotation of the rod, the last-mentioned means comprising a nut permanently mounted to the rod and being disposed adjacent the housing in abutting relation thereto and transmitting force from the rod to the foot plate through the housing, the nut being engageable with a wrench or similar tool to allow rotation of the rod.

2. The brace of claim 1 wherein the casing substantially defines a rectangular solid in conformation, the second end portion thereof including a plate defining an outer wall thereof, the plate having an aperture formed therein, the threaded maintaining means being carried by the plate adjacent to the aperture, the rod extending through the aperture into engagement with the maintaining means.

3. The brace of claim 1 wherein the casing substantially defines a rectangular solid in conformation and wherein the longitudinal axis of the bar extends essentially parallel to the longitudinal axis of the brace.

4. The brace of claim 1 wherein the precluding means comprise a central plate disposed within a plane perpendicular to the longitudinal axis of the casing, the anterior end portion of the bar bearing against said plate.

5. The brace of claim 4 wherein at least one opposed pair of the walls of the casing extend beyond the central plate toward the second end portion of the casing and terminate in a plate perpendicular to said walls, the last-mentioned plate carrying the maintaining means.

6. A brace, comprising:

a rod;

an elongate bar;

a substantially elongate casing having a first end portion and a second end portion, the first end portion comprising spaced walls defining a box-like receptacle open at said first end portion of said casing, one end of the bar being received within the box-like receptacle and extending outwardly of the casing in a direction essentially parallel to the longitudinal axis of the rod to engage a surface of an object against the free end of the bar, thereby extending the effective length of the brace;

means disposed interiorly of the casing for precluding communication between the bar and the rod; and, means carried by the casing at the second end portion thereof and receiving a portion of the rod for maintaining the rod in position relative to the casing when the rod is at rest and for allowing displacement of the rod relative to the casing on movement of the rod to cause the length of the combined rod and casing to vary, at least the free end of the rod extending beyond and externally of the second end portion of the casing, the rod being threaded along at least a portion of its length engaging the maintaining means and at least a portion of the maintaining means being threaded to matingly receive the threaded portion of the rod thereinto to cause displacement of the rod relative to the casing on relative rotation of the rod and of the maintaining means, the casing substantially defining a rectangular solid in conformation, the second end portion thereof including a plate defining an outer wall thereof, the plate having an aperture formed therein, the threaded maintaining means being carried by the plate adjacent to the aperture, the rod extending through the aperture into engagement with the maintaining means, the casing further comprising a second plate oppositely spaced from the first-mentioned plate and a hollow tubular member extending between the plates and being joined thereto, the tubular member being aligned at one end with the aperture in the first-mentioned plate ad receiving the maintaining means therewithin, at leastportions of the rod engaging the maintaining means extending into the interior of the tubular member and being displaceable therewithin, the tubular member providing structural rigidity to the casing.

7. The brace of claim 6 and further comprising:

a foot plate carried by the free end of the rod and being movable relative to the rod.

8. The brace of claim 6 and further comprising:

handle means formed integrally with the rod for facilitating movement of the rod on displacement of the handle means.

9. The brace of claim 6 and further comprising:

shock-absorbing means for mounting the maintaining means to the casing to allow displacement of the rod relative to the casing on imposition of a shock acting along the rod.

10. The brace of claim 6 and further comprising:

a foot plate carried by the free end of the rod.

11. The brace of claim 10 wherein the foot plate is mounted for free rotation to the free end of the rod.

12. The brace of claim 10 wherein the foot plate comprises a relatively flattened plate-like element having a planar outermost surface engageable against a surface of an object.

13. The brace of claim 12 and further comprising engagement means disposed on the outermost surface of the foot plate for facilitating engagement of the plate to a surface of the object.

14. The brace of claim 13 wherein the engagement means comprises an elastomeric pad-like covering.

15. The brace of claim 13 wherein the engagement means comprises cleat-like connectors extending from the outermost surface of the foot plate.

16. The brace of claim 15 wherein the plate is polygonal and the connectors are formed of turned-out corners of the plate.

17. The brace of claim 10 and further comprising:
a housing mounted to an inner surface of the foot plate and having an aperture formed centrally therein to freely receive the distal end of the rod therethrough;
means formed on the distal end of the rod and disposed within the housing for retaining the distal end of the rod within said housing, the foot plate being freely mounted for rotation on the rod; and,
means formed on the rod proximate to the housing for facilitating rotation of the rod.

18. The brace of claim 17 wherein the last-mentioned means is disposed adjacent the housing in abutting relation thereto and transmits force from the rod to the foot plate through the housing.

19. The brace of claim 18 wherein the last-mentioned means comprises a nut permanently mounted to the rod, the nut being engageable with a wrench or similar tool to allow rotation of the rod.

20. The brace of claim 19 wherein the retaining means comprise a nut permanently mounted to the distal end of the rod.

21. The brace of claim 17 wherein the last-mentioned means comprise:
a hollow tubular member mounted to the rod; and,
an elongated rod-like handle freely received within the tubular member and extending from each end thereof, the handle being slipped within the tubular member to expose sufficient portions thereof at a desired end of the tubular member to be manually grasped for effecting rotation of the rod on angular displacement of the handle.

22. The brace of claim 21 and further comprising:
means disposed at the ends of the handle for maintaining the handle within the tubular member.

23. The brace of claim 21 and further comprising:
means disposed adjacent the housing in abutting relation thereto for transmitting force from the rod to the foot plate through the housing.

24. The brace of claim 10 and further comprising means for mounting the foot plate to the free end of the rod for universal motion of the foot plate relative to the rod.

25. The brace of claim 24 wherein the mounting means comprise:
a ball element mounted to the innermost surface of the foot plate; and,
a housing element mounted to the free end of the rod and having a socket chamber formed distally therein to receive and confine portions of the ball element, the foot plate being capable of rotation and out-of-plane movement due to the ball-and-socket action of the mounting means.

26. The brace of claim 6 wherein the maintaining means comprises a threaded nut mounted to the plate.

27. The brace of claim 6 and further comprising engaging means disposed on the free end of the bar for facilitating engagement of the end of the bar to a surface of an object.

28. The brace of claim 27 wherein the engaging means comprise a flat plate and the brace further comprises means for attaching the flat plate to the bar.

29. The brace of claim 28 and further comprising connector means extending from the flat plate for engaging a surface of an object.

30. The brace of claim 29 wherein the connector means comprise cleat-like elements extending from the outermost surface of the flat plate.

31. The brace of claim 29 wherein the flat plate is polygonal and the connector means comprise turned-out corners of the plate.

32. The brace of claim 27 wherein the engaging means comprise a box-like cap open at one end to define an open-ended receptacle for receiving the free end of the bar thereinto.

33. The brace of claim 6 and further comprising means formed on the rod for facilitating rotation of the rod.

34. The brace of claim 33 wherein the last-mentioned means comprise:
an enlarged body portion formed on the free end of the rod and having a transverse bore formed therethrough; and,
an elongated rod-like handle freely received within the bore, the handle being slipped within the bore to expose sufficient portions thereof on either end of the bore to be manually grasped for effecting rotation of the rod on angular displacement of the handle.

35. The brace of claim 34 and further comprising means disposed at the ends of the handle for maintaining the handle within the bore.

36. A brace, comprising:
a rod;
an elongate bar;
a substantially elongate casing having a first end portion and a second end portion, the first end portion comprising spaced walls defining a box-like receptacle open at said first end portion of said casing, one end of the bar being received within the box-like receptacle and extending outwardly of the casing in a direction essentially parallel to the longitudinal axis of the rod to engage a surface of an object against the free end of the bar, thereby extending the effective length of the brace;
means disposed interiorly of the casing for precluding communication between the bar and the rod; and,
means carried by the casing at the second end portion thereof and receiving a portion of the rod for maintaining the rod in position relative to the casing when the rod is at rest and for allowing displacement of the rod relative to the casing on movement of the rod to cause the length of the combined rod and casing to vary, at least the free end of the rod extending beyond and externally of the second end portion of the casing, the rod being threaded along at least a portion of its length engaging the maintaining means and at least a portion of the maintaining means being threaded to matingly receive the threaded portion of the rod thereinto to cause displacement of the rod relative to the casing on relative rotation of the rod and of the maintaining means, the casing substantially defining a rectangular solid in conformation, the second end portion thereof including a plate defining an outer wall thereof, the plate having an aperture formed therein, the casing further comprising
a second plate oppositely spaced from the first-mentioned plate,
a hollow tubular housing mounted to the second plate and extending toward the first-mentioned plate, the housing being open at the distal end thereof;

an elongated tubular member having a bore extending longitudinally thereof and being open distally, the tubular member being freely received through the aperture in the first-mentioned plate, the distal end of the tubular member extending outwardly of the casing through said aperture, the maintaining means comprising a threaded portion of the bore disposed proximate to the distal end of the tubular member to receive the threaded portion of the rod, the anterior end of the tubular member being substantially received within the tubular housing through the open end thereof, a detent plate carried by the tubular member adjacent the inner wall of the first-mentioned plate to limit the degree of movement of the tubular member outwardly of the casing, a pressure plate carried by the tubular member and spaced anteriorly from the detent plate, and a spring carried on the anterior end of the tubular member and being held between the pressue plate and that portion of the second plate defining the inner end wall of the tubular housing, the spring extending anteriorly of the tubular housing and being compressed on inward displacement of the tubular member to absorb shock forces causing such inward displacement, the spring returning the tubular member to an original position on discontinuation of said shock forces, thereby to absorb shock.

* * * * *